United States Patent
Dieker et al.

(10) Patent No.: US 10,813,373 B2
(45) Date of Patent: Oct. 27, 2020

(54) METHOD FOR PRODUCING A TEXTURIZED DAIRY PROTEIN

(71) Applicant: DMK Deutsches Milchkontor GmbH, Zeven (DE)

(72) Inventors: Veronika Dieker, Oldenburg (DE); Anne Buchholz, Georgsmarienhütte (DE); Ralf Zink, Bad Zwischenahn (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 0 days.

(21) Appl. No.: 16/063,521

(22) PCT Filed: Dec. 16, 2016

(86) PCT No.: PCT/EP2016/081588
§ 371 (c)(1),
(2) Date: Jun. 18, 2018

(87) PCT Pub. No.: WO2017/103213
PCT Pub. Date: Jun. 22, 2017

(65) Prior Publication Data
US 2018/0368442 A1    Dec. 27, 2018

(30) Foreign Application Priority Data

Dec. 18, 2015   (EP) .................... 15201234

(51) Int. Cl.
| A23J 3/22 | (2006.01) |
| A23C 21/08 | (2006.01) |
| A23J 3/10 | (2006.01) |
| A23J 3/26 | (2006.01) |
| A23L 11/00 | (2016.01) |
| A23L 7/10 | (2016.01) |
| A23J 3/14 | (2006.01) |
| A23J 3/16 | (2006.01) |
| A23P 30/20 | (2016.01) |
| A23J 3/08 | (2006.01) |
| A23L 35/00 | (2016.01) |
| A23P 30/34 | (2016.01) |

(52) U.S. Cl.
CPC ............... *A23J 3/225* (2013.01); *A23C 21/08* (2013.01); *A23J 3/08* (2013.01); *A23J 3/10* (2013.01); *A23J 3/14* (2013.01); *A23J 3/16* (2013.01); *A23J 3/227* (2013.01); *A23J 3/26* (2013.01); *A23J 3/265* (2013.01); *A23L 7/115* (2016.08); *A23L 11/05* (2016.08); *A23L 35/00* (2016.08); *A23P 30/20* (2016.08); *A23P 30/34* (2016.08); *A23V 2002/00* (2013.01); *A23V 2250/548* (2013.01); *A23V 2250/54246* (2013.01); *A23V 2300/16* (2013.01)

(58) Field of Classification Search
CPC ...... A23J 3/225; A23J 3/10; A23J 3/14; A23J 3/16; A23J 3/26; A23J 3/265; A23P 30/34; A23P 30/20; A23L 7/115; A23L 11/05; A23C 21/08; A23V 200/00; A23V 2250/54246; A23V 2250/548; A23V 2300/16

See application file for complete search history.

(56) References Cited

U.S. PATENT DOCUMENTS

| 4,361,588 A * | 11/1982 | Herz ................. A23J 3/225 426/104 |
| 2003/0003194 A1 | 1/2003 | Roussel et al. |
| 2004/0161519 A1 | 8/2004 | Walsh et al. |
| 2004/0253363 A1 | 12/2004 | Nakano et al. |
| 2005/0084578 A1 * | 4/2005 | Onwulata ............ A23J 3/265 426/516 |
| 2009/0263553 A1 | 10/2009 | Licker et al. |
| 2009/0263565 A1 | 10/2009 | Ryder et al. |
| 2012/0064209 A1 | 3/2012 | Ardisson-Korat et al. |
| 2018/0168189 A1 * | 6/2018 | Dieker ............... A23J 3/225 |

* cited by examiner

*Primary Examiner* — Anthony J Weier
(74) *Attorney, Agent, or Firm* — Dilworth & Barrese, LLP

(57) ABSTRACT

The invention relates to textured milk proteins (TDP) that can be obtained by virtue of: (a) a mixture containing or consisting of (a1) milk proteins and (a2) a fibrous material and/or plant protein, wherein (b) said mixture is extruded in the presence of water and/or whey with a temperature gradient of approximately 20 to approximately 200° C. and a pressure in the range of 1 to approximately 200 bar being applied, and (c) the extrudate is subsequently expanded.

9 Claims, No Drawings

METHOD FOR PRODUCING A TEXTURIZED DAIRY PROTEIN

FIELD OF THE INVENTION

The invention is located in the foods sector and relates to new milk-based protein products which are distinguished by specific textures.

PRIOR ART

According to a WTO study from 2012, the nutritional demand worldwide will at least double in the next 25 years. This is a challenge which can be met only with sustainable agriculture and with the development of new food sources. A large potential for the production of vital basic nutritional building blocks is milk, which is distinguished in particular by a high protein content. Milk and whey protein concentrates already play an important part today, for example, in infant nutrition, and are distinguished relative to vegetable proteins by containing all of the essential amino acids in nutritionally sufficient quantity.

Adequate supply of proteins is essential to human nutrition. The German Nutritional Association (DGE) recommends a daily adult protein intake of 0.8 g per kg of bodyweight. For children, young people and, especially, nursing infants, the demand is significantly higher still. Older persons are found frequently not to be receiving sufficient protein. Too low a consumption of protein can lead to breakdown of endogenous protein, with the consequence that all protein-regulated functions within the body are disrupted.

Against the background of advancing alternative forms of diet (e.g., vegan or vegetarian nutrition), where an adequate supply of protein—in terms both of the amount consumed and of the quality (i.e., consumption of essential amino acids)—is not always ensured, alternative forms of protein consumption are gaining in importance.

Foods available on the market to date are, in particular, those which per se have a high protein content and in which merely the source of protein is replaced. In general here, meat proteins are replaced by other proteins, usually plant proteins. Typical meal replacement products based on plant proteins or else hen's-egg protein (e.g., vegetarian schnitzel) are currently in high demand. The sensorial profile of these products completely mimics the meat original.

The accumulation of various foodstuff preparations with proteins for the purpose of achieving a health advantage is also presently seeing acceleration, whereas previously this was envisaged solely for foods in certain target groups (such as sportspersons, for example).

Given sufficient protein content, foods may be labeled with the label "source of protein" or "of high protein content". Under currently applicable foodstuffs law (Regulation (EC) No. 1924/2006 of the European Parliament and of the Council of 20 December on nutritional and health claims concerning foodstuffs—known as the "Health Claims Regulation"), protein content may be highlighted as follows:
  A foodstuff may be termed a "source of protein" if the protein fraction accounts for at least 12% of the total energy value of the foodstuff.
  A foodstuff may be marked out as of "high protein content" if the protein content accounts for at least 20% of the total energy value of the foodstuff.

The prior art has already disclosed a variety of products which attempt to mimic a flesh like texture using whey proteins.

EP 1059040 B1 (BONGRAIN) describes a textured product which is obtained in the extrusion of milk or cheese. Specifically it describes how a raw material mixture comprising whey proteins and water is fed to an extruder and then zonally heated first to 130° C. and then to 200° C., with the pressure rising from 0 up to a maximum of 50 bar. The extrudate is subsequently shaped and cooled. Among the compositions identified is a mixture which comprises whey proteins together with pea proteins and casein. The characteristic feature of the textures is that they form a network consisting of extended fibers of defined diameter, the fibers forming branches which make up only about one tenth of their diameter.

The international patent application WO 2006 130025 A1 (FONTERRA) discloses, for example, a method for producing extruded dairy proteins for use in snack products, the ingredients used including dairy proteins and starches.

The international patent application WO 2012 036910 A1 (FRITO LAY) as well discloses snack products obtained by subjecting dairy proteins to processing under pressure in the presence of calcium carbonate and then to controlled expansion.

Subject matter of the U.S. Pat. No. 6,607,777 B1 (UNIV UTAH) are dairy proteins with meatlike texture which are obtained by extrusion under pressure and subsequent depressurization.

U.S. Pat. No. 8,642,109 B2 (SOLAE) claims soya protein nuggets which are obtained by joint extrusion of soya proteins and carbohydrates.

Subject matter of U.S. Pat. No. 2,004,161 519 A1 (WALSH) are textured whey proteins as a meat replacement, which are obtained by extruding whey proteins together with carbohydrates. In examples 9 to 11, with reference to example 1, a description is given of how a mixture of WPC80 and soya protein is textured with water, with addition of corn starch, in a twin-screw extruder. The temperature at the outlet of the extruder is, with a linear increase, up to 150° C., and the process proceeds in the range from 50 to 500 psi. The extruded material is subsequently dried and ground to form a powder.

U.S. Pat. No. 2,004,253 363 A1 (NAKANO) as well has as its subject matter meat replacements, in this case obtained by extruding mixtures of plant proteins and whey proteins. Example 1 describes how a mixture of soybean powder and WPC80 is introduced together with water into an extruder. The mixing ratio of protein to water is 20 kg/h:8 to 9 l/h. After departing the extruder, the product was cut and dried down to a residual water content of 10 wt %.

U.S. Pat. No. 2,009,263 553 A1 (LICKER) discloses textured dairy proteins obtained by extruding a mixture of 35 wt % of caseinate, 5 wt % of fibers, and also 34 wt % of potato starch and 24.25 wt % of tapioca starch, at a water content of 28 to 34 wt %. The process is carried out at a temperature gradient of 23-43° C. to 65 to 163° C. under a pressure of 68 to 96 bar. The extrudates are subsequently depressurized and cut.

Subject matter of U.S. Pat. No. 2,009,263 565 A1 (RYDER) is the production of textured protein compositions based essentially on vegetable proteins and gluten. The mixture is extruded, unpressurized and without addition of water, at a temperature gradient from 40 to 150° C.

A disadvantage, however, is that the processes always only enable one texture, which runs counter to the need to be able to mimic as many different structures as possible in order to be able to make a flexible response to the wishes of the purchasers. A further considerable disadvantage is that the prior-art processes are unable to do without the accompanying use of adjuvants, especially of starch, since otherwise the textures cannot be stably produced. In many cases, however, this results in a mouthfeel which the consumer associates only conditionally, for example, with chicken or tuna. Moreover, the addition of starch alters the nutritional value of the texturized products in such a way as to reduce the protein content as a result of an increase in the carbohydrate content. The objective of the present invention, conversely, is for a highly protein-rich product.

The object of the present invention, therefore, was to provide textures based on dairy proteins, more particularly whey proteins and/or caseins, that are as diverse as possible. Specifically, dairy proteins ought to be processed in such a way as to form products which in terms of their texture, according to processing conditions, call to mind, for example, poultry, fish, vegetables, mushrooms, tofu or else peanut puffs. The method ought to allow such variation that the texture can be controlled by the processing conditions, meaning that, through minimal alteration in pressure, temperature, residence time, and the like, quite different products can be produced in the same unit without having for that purpose to modify the method itself.

DESCRIPTION OF THE INVENTION

A first subject of the invention relates to texturized dairy proteins, also referred to hereinafter by the abbreviation (TDP), which are obtainable by
(a) a mixture comprising or consisting of
  (a1) dairy proteins and
  (a2) a fiber material and/or plant protein,
(b) extruding the mixture in the presence of water and/or whey with application of a temperature gradient from about 20 to about 200° C. and at a pressure in the range from 1 to about 200 bar, and
(c) subsequently depressurizing the extrudate.

A further subject of the invention relates to an analogous method for producing texturized dairy proteins (TDP), comprising the following steps:
(a) providing a mixture comprising or consisting of
  (a1) dairy proteins and
  (a2) a fiber material and/or plant protein,
(b) extruding the mixture in the presence of water and/or whey with application of a temperature gradient from about 20 to about 200° C. and at a pressure in the range from 1 to about 200 bar, and
(c) depressurizing the extrudate.

Surprisingly it has been found that dairy proteins can be processed together with plant proteins and/or fiber materials to form extrudates which have any of a very wide variety of different textures dependent on extrusion conditions and subsequent cooling and processing steps.

Ingredients

Primary ingredients (component a1) contemplated for the TDP are dairy proteins, specifically whey proteins (concentrates, isolates, hydrolysates) and caseins.

Whey proteins and casein are the two major protein fractions in the milk from mammals. The protein content of cow's milk, amounting to around 3.3%, is composed of around 2.7% of casein and around 0.6% of whey protein. The designation "whey protein" is derived from the fact that the proteins of this fraction are the major constituent of the proteins in whey. Whey proteins are a group of various albumins and globulins. In detail these are:
  alpha-lactalbumin around 20% (0.1% in the milk)
  beta-lactoglobulin around 45% (0.25% in the milk)
  immunoglobulins around 10%
  proteose peptone around 20%
  serum albumin around 5%

Whey proteins are heat-sensitive. When milk is boiled, it is in particular the β-lactoglobulin which is responsible for the skin on the surface. Whey proteins also include a high level of branched-chain amino acids, such as about 20% to 25% of the majority of food proteins. Whey proteins are classed as of high grade in terms of nutritional physiology (high biological value). They are therefore a major constituent of the whey-based protein powders for muscle building.

The simplest form of whey protein is that of whey protein concentrate. It is manufactured principally by ultrafiltration. It possesses a relatively high protein content of about 70% to 80%. Because of the simple manufacture of the raw material in dairies, it is substantially more favorable than whey protein isolate and hydrolysate. Consequently, it is regarded as the first choice by food supplement suppliers in the manufacture of their products. Owing to a carbohydrate proportion of about 6% to 8% and a fat proportion of about 4 to 7 wt %, the protein content is somewhat lower than in the case of the isolate.

In the manufacture of whey protein isolate, two different processes are employed. In the case of the ion exchange process, the whey proteins are adsorbed on the ion exchangers and eluted, causing the protein preparations to contain more salts. In the case of manufacture of whey protein isolate by the microfiltration process, no salts are used. As a result it is possible to obtain a particularly high purity, with a protein proportion of about 90% to 96% and also with a low fat content and lactose content of less than one percent. Moreover, whey protein isolate on account of its virtually lactose-free status is particularly suitable for persons with lactose intolerance.

In the manufacture of whey protein hydrolysate, the hydrolysis process is employed. As a result of the hydrolysis (splitting-up) of the protein chains into very small fragments (peptides), whey protein hydrolysate can be absorbed more quickly by the body. The greater the degree of hydrolysis, the more high-grade and more expensive the protein. A disadvantage to be cited is the bitter taste. Consequently, the principal application of whey protein hydrolysate is in amino acid tablets and capsules, where the bitter taste plays only a subordinate role. In small proportions, whey protein hydrolysates are added to mixtures of various high-grade proteins (multicomponent proteins).

Casein likewise constitutes a mixture of a plurality of proteins (αS1-, αS2-, β-, κ-casein), and serves for storage and transport of protein, calcium, and phosphate to the neonate. Casein in milk, together with calcium phosphate and other constituents, forms micelles. Typical examples of suitable casein include not only caseins obtained by acid treatment but also micellar casein from the microfiltration of skim milk.

In the course of the invention, the finding was made that for the texturizing of the end products it is critical that the extrusion takes place together with plant proteins, which endow the products with a texture typical in terms of sensation of poultry, fish, mushrooms, tofu or else peanut puffs. Furthermore, the addition of vegetable fibers may prove advantageous for the product texture. Such fiber materials may be a constituent of vegetable protein concentrates. Alternatively, fibers are added separately as a raw material (e.g., when using plant protein isolates). The folding of the protein structure in these vegetable proteins has likewise proven, moreover, to be highly advantageous when the aim is to endow the products with a texture.

Component (a2) is used customarily in a proportion of about 1 to about 75 wt %, preferably about 10 to about 60 wt %, more preferably about 25 to about 50 wt %, and very preferably about 30 to about 40 wt %, and more particularly about 40 to about 50 wt %, based on the total amount of components (a1) and (a2).

Extrusion and Shaping

The development of various textures is dependent on the extruder operating conditions. With preference the mixtures of (a1) dairy proteins and also (a2) plant proteins and/or fibers are extruded with application of a temperature gradient from about 40° C. to about 170° C. The pressure gradient is set from 1 bar to about 120 bar.

The extrusion of the protein/fiber mixtures makes the accompanying use of water unavoidable. Here a distinction is made between "low moisture" and "high moisture" processes.

Low Moisture Process

In the former case, the mixtures are extruded in the presence of about 10 to about 50 wt % and more particularly about 20 to about 40 wt % of water and/or whey—based on the total amount of raw materials used, i.e., the amount of components (a1+a2) and water and/or whey. The extrusion takes place under pressure, which is a result in particular of the parameters of rotary speed and temperature and is set at about 30 to 120 bar and more particularly about 50 to 110 bar. The extrusion is carried out preferably in a twin-screw extruder which possesses corotating, shear-intensive screws.

The extrusion takes place, moreover, with application of a temperature gradient from about 20 to about 200° C. and more particularly about 40 to about 170° C. What this means is that the extruder, which possesses an outer heating/cooling jacket and a series of separately controllable temperature zones, has a lower temperature in the front region than in the rear region. A large difference in pressure and temperature between extruder interior and environment is beneficial to the expansion of the resultant extrudates following emergence from the extruder.

Depending on facility, rotary speeds should be set of about 200 to about 2000 rpm. The preferred ingredients in terms of the components (a1) dairy proteins here are casein and/or caseinates.

A typical mode of processing of products by the low moisture process involves depressurizing them to atmospheric pressure in one step after they have left the extruder, and bringing the resulting composition into a piece form. Immediately on leaving the extruder, the product still has a temperature of about 120 to about 140° C., meaning that the water or the water fraction of the whey undergoes almost complete evaporation. The product inflates and adopts a texture which can be most closely compared with that of peanut puffs. The composition can be processed by means of a shaping die and subsequent cutting apparatus. Relative to starch-based extrudates, the products are distinguished in that they remain dimensionally stable after being placed in water. Optionally, an aftertreatment may be carried out on the products generated by the process described, in the form of further drying.

High Moisture Process

In the latter case, the mixtures are extruded in the presence of about 50 to about 75 wt % and more particularly about 55 to about 60 wt % of water and/or whey—based on the total amount of the raw materials used, i.e., the amount of components (a1+a2) and water and/or whey. The extrusion, again, takes place under pressure, which arises in particular from the parameters of rotary speed and temperature and is set at about 5 to 50 bar and more particularly about 10 to 30 bar. With this variant as well, the extrusion is carried out preferably in a twin-screw extruder which possesses corotating, shear-intensive screws.

The extrusion takes place, moreover, with application of a temperature gradient from likewise about 20 to about 200° C. and more particularly about 40 to about 170° C. In this case, necessarily, the temperature profile is not linear, but instead rises from the front to the middle part of the extruder to the highest temperature, before then decreasing again at the end. A regime of this kind may exhibit, for example, the following profile: increase from 20 to 40° C. to 160 to 200° C. (in the middle of the extruder) and drop (at the outlet of the extruder) to 100 to 140° C. A regime of this kind ensures particularly stable and uniform textures.

Since the products have a relatively high water proportion, the viscosity during processing is lower than in the case of the low moisture process. Depending on facility, the rotary speeds to be set are from about 200 to about 2000 rpm. Here again, the extrusion can be carried out, rather than with water, with whey or with a mixture of water and whey. The preferred ingredients in terms of the components (a1) dairy proteins here are whey proteins.

The nature of cooling, depressurization, and further processing may also influence the texture. In the simplest scenario, the products after leaving the extruder are depressurized in the air or in a cooling bath.

Preferably, however, after leaving the extruder, and with retention of the pressure, the mixtures are passed into a cooling tunnel, so that the cooled composition emerges under atmospheric pressure only in this way. A cooling tunnel is a simple component which consists, for example, of a pipe having a cooled outer jacket. The extruded composition is fed in at one end and departs the cooling tunnel at the other end, during which it is brought to ambient pressure. The cooling tunnel typically has a constant cross section over its entire length. The length and cross section of the cooling tunnel are dependent on the extruder size and on the resultant product throughput. The use of a cooling tunnel is a codeterminant in the construction of certain textures, since the conveying of the extrusion mixture through the pipe results in cooling from outside into the interior of the composition, thereby generating a particularly fibrous structure.

On emergence, the cooled composition still has a temperature of about 50 to 80° C. and is brought subsequently into piece form, by portioning the strand of texturized product using knives, for example. For further texturizing it is subsequently advisable to subject the compositions to at least one of the two following measures:
(i) deep-freezing and thawing and/or
(ii) cooking in stock.
Both measures serve to loosen the structure.

INDUSTRIAL APPLICABILITY

A further subject of the invention relates to the use of the texturized dairy proteins or of the corresponding method products as nutritional replacements, for meat, fish, vegetables, mushrooms or tofu, for example.

EXAMPLES

Examples 1 to 6—Production of the Texturized Dairy Proteins (TDP)

General Production Protocol for Texturizing by the Low Moisture Process

A dry mixture containing dairy proteins (component a) and plant proteins and/or fibers (component b) was applied together with 22 to 33 wt % of water (based on the total mixture) to a twin-screw extruder consisting of 10 barrel units, where barrel units 2-10 were each individually heatable, whereas the first barrel unit could not be heated. Zones 1 to 3 served for feeding and mixing, zones 4 to 7 for a cooking procedure (protein melting and compression), and zones 8 to 10 for buildup of pressure. Depending on the facility, the raw materials used, and the recipe, the mixture was conveyed with a rotary speed in the range from 200 to 1500 rpm under a pressure set at from 40 to 110 bar.

General Production Protocol for Texturizing by the High Moisture Process

A dry mixture containing dairy proteins (component a) and plant proteins and/or fibers (component b) was applied together with 52 to 75 wt % of water and/or whey (based on the total mixture) to a twin-screw extruder consisting of 10 barrel units, where barrel units 2-10 were each individually heatable, whereas the first barrel unit could not be heated. Zones 1 to 3 served for feeding and mixing, zones 4 to 7 for a cooking procedure (protein melting and compression), and zones 8 to 10 for buildup of pressure and for initial cooling. Depending on the facility, the raw materials used, and the recipe, the mixture was conveyed with a rotary speed in the range from 400 to 1500 rpm under a pressure set at from 10 to 60 bar.

Further Processing of the Texturized Product Composition Obtained from the Low Moisture and High Moisture Processes (I) Immediate passage of the hot and plastic composition via a perforated plate (holes 4 mm in diameter) and rotating knives. During this procedure, the product underwent depressurization to ambient pressure, with the water evaporating apart from a slight residual moisture content. The throughput was around 50 kg/h.
(II) Continuous passage from the extruder with a throughput of around 12 kg/h and depressurization to ambient pressure in a cooling bath.
(III) Continuous passage from the extruder with a throughput of around 14 kg/h into a cooling tunnel and depressurization to ambient pressure. The extruded strand, with a temperature of 70° C., was portioned using knives and the portions, after cooling, were deep-frozen to −18° C.

In terms of texture and mouthfeel, the resulting products were reminiscent of the following original products:
A Chicken
B Dry meat (beef jerky)
C Tuna
D Tofu
E Peanut puffs The results are summarized in Table 1 below.

TABLE 1

Low moisture process and high moisture process (quantities as wt %)

| | 1 | 2 | 3 | 4 | 5 | 6 |
|---|---|---|---|---|---|---|
| Parameter | | | | | | |
| Dry mixture | 78 | 67 | 45 | 40 | 37.5 | 35 |
| Whey protein concentrate (min. 80%) | — | 10 | 50 | 50 | 30 | — |
| Casein (min. 95%) | 32 | 15 | — | — | 20 | 30 |
| Pea protein isolate (min. 84%) | — | 20 | — | 35 | — | — |
| Soya protein concentrate (min. 67%) | 68 | 50 | 50 | — | 50 | 70 |
| Pea fibers | — | 5 | — | 15 | — | — |

TABLE 1-continued

Low moisture process and high moisture process (quantities as wt %)

| | 1 | 2 | 3 | 4 | 5 | 6 |
|---|---|---|---|---|---|---|
| Dairy protein:plant protein/fibers | 32:68 | 25:75 | 50:50 | 50:50 | 50:50 | 30:70 |
| Water*) | 22 | 33 | 55 | 60 | 62.5 | 65 |
| Process: Low moisture (LM), high moisture (HM) | LM | LM | HM | HM | HM | HM |
| Extrusion conditions Temperature (° C.) | | | | | | |
| Feed | 25 | 25 | 32 | 35 | 37 | 36 |
| Cooking zone | 170 | 170 | 150 | 165 | 145 | 160 |
| Emergence | 170 | 170 | 118 | 130 | 110 | 115 |
| Shaping | I | I | III*¹⁾ | III*¹⁾ | III*¹⁾ | II |
| Texture | E | E | A | C | B | D |

*)Examples 1, 2, 3, and 6 were carried out with water, example 5 with a 1:1 mixture of water and whey, and example 4 with pure whey.
*¹⁾Cooling channel heated at 30° C.
*²⁾Cooling channel heated to 90° C. for ease of foaming and expansion of the products after emergence from the cooling tunnel

FORMULATION EXAMPLES

Example F1

Meatballs with Texturized Dairy Proteins (TDP) as Meat Extender

Preparation of the TDP:

Soak TDP from example 1 in sufficient water for around 20 hours, then drip dry on a sieve and press out using a perforated cloth. Comminute the TDP, in a Thermomix, for example (150 g fill; level 5; 5 s).

Preparation of the Meatballs:

250 g of minced meat (half beef/half pork), 1 egg, 100 g of TDP from example 1 (prepared), 10 g of mustard, 1 g of salt, 50 g of finely chopped onions and 1 pinch of black pepper are kneaded into a mass. Meatballs are shaped from the mass and fried both sides in oil in a pan.

Example F2

Filled Bell Peppers with Texturized Dairy Proteins (TDP) as Meat Extenders in the Minced Meat Filling Preparation of the TDP:

Soak TDP from example 1 in sufficient water for around 20 hours, then drip dry on a sieve and press out using a perforated cloth. Comminute the TDP, in a Thermomix, for example (150 g fill; level 5; 5 s).

Preparation of the Filled Bell Peppers:

From 4 red bell peppers, around ¼ is cut off from the top end as a lid, the core is removed, and the peppers are rinsed. 70 g of rice are cooked through with a pinch of salt in around 170 ml of water. 1 finely chopped onion, 250 g of minced meat (half beef/half pork), 100 g of TDP from example 1 (prepared), 1 egg, and the cooked rice are kneaded with one another. The mass is seasoned with salt and pepper and the bell peppers are filled with the mass. Preparation of the tomato sauce: 1 finely chopped onion and 1 garlic clove (crushed) are lightly fried in 2 tbps of olive oil in a pan. 400 g of peeled tomatoes (canned product), ⅛ l of vegetable broth and 20 g of tomato paste are added and the sauce is brought to the boil. The tomato sauce is placed into a (lidded) baking dish, the bell peppers are placed in, and the pepper lids are placed onto the filled peppers. The baking dish is closed with the lid and the peppers are cooked in a preheated baking oven at 200° C. for around 1 h.

Example F3

Gourmet Vegetarian Salad in the Manner of a Poultry Salad with Texturized Dairy Proteins Preparation of the TDP:

TDP from example 3 are thawed and cooked for about 7 to 10 minutes in plenty of boiling stock, preferably chicken stock.

Preparation of the Gourmet Salad:

Preparation of a salad composition from 175 g of mandarins (drained weight, canned product), 130 g of sliced mushrooms (drained weight, canned product), 110 g of chopped asparagus (drained weight, canned product), 1 pinch of salt, 1 pinch of black pepper, 270 g of salad cream, and 300 g of TDP from example 3 (prepared): all of the ingredients are combined with one another by careful stirring and folding in.

Example F7

Vegetarian Meal in the Manner of a Chicken Fricassee with Texturized Dairy Proteins Preparation of the TDP:

TDP from example 3 are thawed and cooked for about 7 to 10 minutes in plenty of boiling stock, preferably chicken stock.

Preparation of the Chicken Fricassee:

Preparation of a roux from 20 g of butter and 20 g of flour: melt butter in a dish and thicken with the flour until a uniform roux is formed; dilute with 240 g of water, add 6 g of chicken broth (instant); carefully stir in 80 g of chopped asparagus (drained weight, canned product), 50 g of sliced mushrooms (drained weight, canned product), and 50 g of frozen peas. Subsequently add 190 g of goujoned TDP from example 3 (prepared). Stir in about 40 g of cream and 1 pinch of ground nutmeg.

Example F4

Chicken nuggets/schnitzel with texturized dairy proteins

Version 1:

Preparation of the TDP:

TDP from example 3 are thawed and cooked for about 7 to 10 minutes in plenty of boiling stock, preferably chicken stock.

Preparation of Chicken Nuggets/Schnitzel:

Preparation of a protein binder: prepare a dry mixture of 50 g of whey protein concentrate, 12 g of pregelatinized wheat flour, 12 g of skim milk powder, 5.5 g of salt, and 12.5 g of potato starch (cold-swelling). Stir the dry mixture into 115 g of water.

From the extruded strands from example 3 (prepared), corresponding nugget or schnitzel shapes are cut out (industrially: shaping by a shaping machine). These shapes are dipped briefly into the binding solution and then rolled in breadcrumbs (industrially: dry breadcrumbing unit). Thereafter the nuggets or schnitzels are firstly prefried in hot oil in a deep fryer for 50 s. Immediately before consumption, the nuggets or schnitzels are fried again in the deep dryer in hot oil for 50 s. Alternatively the texturized products can also be comminuted and then glued together with the protein binder. Subsequent processing is as described above. Preparation in the pan is also possible.

Version 2:

Preparation of the TDP:

Soak TDP from example 1 in sufficient water for around 20 hours, then drip dry on a sieve and press out using a perforated cloth. Comminute the TDP, in a Thermomix, for example (150 g fill; level 5; 5 s).

Preparation of Chicken Nuggets/Schnitzel:

Mix 200 g of TDP from example 1 (prepared) with 90 g of protein binder. Shape the mass into nuggets, turn in breadcrumbs, and prefry in a deep fryer in hot oil for 50 s. Directly before consumption, the nuggets or schnitzels are fried again in the deep dryer in hot oil for 50 s. Preparation in the pan is also possible.

Example F5

Gyros-Style Goujons with Texturized Dairy Proteins

Preparation of the TDP:

TDP from example 3 are thawed and cooked for about 7 to 10 minutes in plenty of boiling stock, preferably chicken stock.

Preparation of the Gyros-Style Goujons:

Goujon 360 g of TDP from example 3 (prepared) and combine with 25 g of rapeseed oil and 5 g of gyros seasoning, and marinate in a refrigerator if desired. Lightly fry the texturized product in a little oil in the pan.

Example F6

Soup with Texturized Dairy Proteins

Preparation of the TDP:

TDP from example 3 are thawed and cooked for about 7 to 10 minutes in plenty of boiling stock, preferably chicken stock.

Preparation of the Soup:

Stir 20 g of chicken broth (instant) into 2 l of water and boil.

Strip-slice ½ a trimmed leek (cut into rings), around 2 peeled and finely chopped carrots, and 240 g of TDP from example 3 (prepared) and add, and briefly boil. Season with salt and pepper as required.

Example F7

Casserole with Texturized Dairy Proteins

Preparation of TDP:

TDP from example 3 or 5 are thawed and cooked for about 10 to 15 minutes in plenty of boiling stock, preferably chicken stock.

Preparation of the Casserole:

Strip-slice 400 g of TDP from example 3 or 5 (prepared) and place into a casserole dish (after light frying if required) and season with salt and pepper. Spread 480 g of sliced peaches (canned product, drained weight) over the TDP. Prepare a curry sauce and pour it over, topping with grated cheese. Bake the casserole in the baking oven at 200° C. for 25 min.

Example F8

Salad Topping of Texturized Dairy Proteins

Preparation of the TDP:

TDP from example 4 are thawed and cooked for about 5 to 10 minutes in plenty of boiling stock, preferably chicken stock.

Preparation of the Salad Topping:

Strip-slice 100 g of TDP from example 4 (prepared), place in marinade for several hours if desired, lightly fry, and arrange on a salad (e.g., different leaf salads).

Example F9

Wraps with Texturized Dairy Proteins

Preparation of the TDP:

TDP from example 6 are thawed and cooked for about 5 to 10 minutes in plenty of boiling stock, preferably chicken stock.

Preparation of the Filling (for Around 8 Wraps):

Cut 300 g of zucchini into slices and lightly fry in oil. Add 180 g of soya shoots (canned product, drained weight). Season with salt, pepper and cayenne pepper. Strip-slice 100 g of texturized TDP from example 6 (prepared) and add. Warm tortillas in the pan. Distribute filling between tortillas, add salad, tomatoes or salad dressing to taste, and fold the tortillas into wraps.

Example F10

Pizza with Texturized Dairy Proteins

Preparation of the TDP:

TDP from example 3 are thawed and cooked for about 7 to 10 minutes in plenty of boiling stock, preferably chicken stock.

Preparation of the Pizza Dough:

Dissolve 20 g of yeast with 1 pinch of sugar, 1 tsp salt and 25 ml of olive oil in 200 ml of lukewarm water. Add 330 g of flour (type 405) and knead into a dough. Place the yeasted dough in a warm place until its volume has doubled. Roll out the dough on a baking sheet lined with baking paper.

Preparation of the Topping:

Coat pizza dough with strained tomatoes and sprinkle with oregano seasoning. Top pizza with TDP from example 3 (strip-sliced; optionally further size-reduced into fine meat fibers) (top as desired with further ingredients, e.g., bell pepper, artichokes, tomatoes, etc.) and sprinkle with grated cheese. Bake the pizza in the preheated baking oven at 220° C. for 20 minutes.

Example F11

Loaf with Texturized Dairy Proteins

For 6 loaves, prepare a dough in a kneader from 2850 g of rye flour type 997, 930 g of wheat flour type 550, 114 g of sour dough (dry), 80 g of salt, 53 g of yeast, 2640 g of water (temperature: 36° C.) and 540 g of TDP from example 2 (soaked in water, dripped dry and pressed out; comminuted or uncomminuted) (knead at 60 rpm for 5 min, then knead at 90 rpm for 7 min). Remove the dough from the kneader, form into a dough mass, and leave to stand for 30 minutes. Divide the dough into pieces with a weight of 1150 g. Make loaf shapes round and long by hand and place them each into a loaf tin greased with oil or baking spray. Treat the surface of the loaf with a dough docker and moisten them with a little water. Place the loaves in the proving oven for 50 minutes at a temperature of 35° C. and 80% relative humidity. Thereafter bake the loaves in a rack oven at a temperature of 180° C. for 60 minutes (preheat oven beforehand to a temperature of 240° C., set steaming for 1-2 minutes at start of baking). The core temperature of the loaves after the end of baking is 98° C. Remove the loaves from the tin after baking and allow to cool.

Example F12

Daily Products with Texturized Dairy Proteins

Stir 5 g of TDP from example 2 (dry or soaked, comminuted or uncomminuted) into 150 g of yoghurt. The dry extrudate may optionally be soaked beforehand for at least 12 h in a flavoring liquid instead of water (e.g., fruit juice).

Example F13

Muesli with Texturized Dairy Proteins

Process 150 g of wholegrain wheat flakes, 150 g of wholegrain oat flakes, 150 g of TDP from example 1 (dry, comminuted or uncomminuted), 60 g of cornflakes, 100 g of hazelnuts, 50 g of raisins and 50 g of sunflower seeds into a dry mixture.

Example F14

Muesli Bars with Texturized Dairy Proteins

Process 150 g of wholegrain wheat flakes, 150 g of wholegrain oat flakes, 150 g of TDP from example 2 (dry or soaked, preferably comminuted), 60 g of cornflakes, 100 g of hazelnuts, 50 g of raisins and 50 g of sunflower seeds into a dry mixture. Heat 50 g of butter, 120 g of runny honey and 100 g of sugar in a pan with stirring and add the dry mixture. Thereafter caramelize the muesli mass in the pan for around 3 minutes. Spread the mass onto a baking sheet lined with baking paper and cut into bars after about 15 minutes. Then leave the muesli bars to firm up.

Example F15

Dry Crumb Coating of Texturized Dairy Proteins

Comminute TDP from example 1 (dry) to the desired particle size in a kitchen machine or a Thermomix. The protein powder can be used like breadcrumbs (e.g., as crumb coating on schnitzels or on vegetables).

The invention claimed is:

1. A method for producing a texturized dairy protein (TDP), comprising the following steps:
    (a) providing a mixture consisting of
        (a1) a dairy protein, and
        (a2) a fiber material and/or plant protein,
    (b) extruding the mixture in the presence of about 50 to about 75 wt % of water and/or whey with application of a temperature gradient from about 20 to 40° C. at the inlet, via a peak temperature of about 160 to 200° C. in the middle, and a drop to about 100 to 140° C. at the outlet of the extruder, and with application of a pressure in the range from 1 to about 200 bar, and
    (c) depressurizing the extrudate.

2. The method as claimed in claim 1, wherein dairy proteins, whey proteins and/or casein are used as component (a1).

3. The method as claimed in claim 1, wherein component (a2) is used in a fraction of about 25 to about 75 wt %, based on the total amount of components (a1) and (a2).

4. The method as claimed in claim 1, wherein the mixture is extruded with a rotary speed in the range from about 200 to about 2000 rpm.

5. The method as claimed in claim 1, wherein the mixture is depressurized to atmospheric pressure in one step after leaving the extruder and brought into pieces.

6. The method as claimed in claim 1, wherein the mixture is depressurized into a cooling bath after leaving the extruder.

7. The method as claimed in claim 1, wherein the mixture is passed into a cooling tunnel under pressure after leaving the extruder to cool the composition so that it leaves the cooling tunnel at atmosphere pressure.

8. The method as claimed in claim 1, wherein the extruded composition is brought into pieces and, for further texturizing, is subjected to at least one of the two following measures:
   (i) deep-freezing and thawing, and/or
   (ii) cooking in stock.

9. The method of claim 1, comprising providing texture of the dairy protein of fish, vegetables, mushrooms or tofu.

\* \* \* \* \*